US012689949B2

(12) United States Patent
Li

(10) Patent No.: US 12,689,949 B2
(45) Date of Patent: Jul. 21, 2026

(54) CELL RESELECTION PARAMETER CONFIGURATION AND CELL RESELECTION METHOD AND DEVICE, AND STORAGE MEDIUM

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 368 days.

(21) Appl. No.: 18/552,594

(22) PCT Filed: Mar. 30, 2021

(86) PCT No.: PCT/CN2021/083883
§ 371 (c)(1),
(2) Date: Sep. 26, 2023

(87) PCT Pub. No.: WO2022/204927
PCT Pub. Date: Oct. 6, 2022

(65) Prior Publication Data
US 2024/0179582 A1      May 30, 2024

(51) Int. Cl.
*H04W 36/00*      (2009.01)
*H04W 76/27*      (2018.01)

(52) U.S. Cl.
CPC ........ *H04W 36/0055* (2013.01); *H04W 76/27* (2018.02)

(58) Field of Classification Search
CPC ............... H04W 36/00; H04W 36/005; H04W 36/0055; H04W 36/08; H04W 36/083;

H04W 36/085; H04W 36/24; H04W 36/249; H04W 76/00; H04W 76/20; H04W 76/27; H04W 48/08; H04W 48/12; H04W 48/16; H04W 48/20; H04B 7/185; H04B 7/1851; H04B 7/18513; H04B 7/18515; H04B 7/18519; H04B 7/18539; H04B 7/18541; H04B 7/18545
See application file for complete search history.

(56) References Cited

U.S. PATENT DOCUMENTS

| | | | | |
|---|---|---|---|---|
| 2023/0135073 A1* | 5/2023 | Xu | ................. | H04W 36/00835 |
| | | | | 370/331 |
| 2023/0300700 A1* | 9/2023 | Rune | .................... | H04W 48/16 |
| | | | | 370/329 |

FOREIGN PATENT DOCUMENTS

| | | | | |
|---|---|---|---|---|
| WO | WO 2020231123 A1 | 11/2020 | | |
| WO | WO-2022139216 A1 * | 6/2022 | ............ | H04W 48/20 |

(Continued)

OTHER PUBLICATIONS

Machine Translation of WO-2022141639-A1 (Year: 2022).*

(Continued)

*Primary Examiner* — Paul H. Masur
(74) *Attorney, Agent, or Firm* — Finnegan, Henderson, Farabow, Garrett & Dunner, L.L.P.

(57) ABSTRACT

A method for configuring a parameter for a cell reselection is performed by a base station, and includes: configuring, for a terminal, a target time parameter for performing the cell reselection, wherein the target time parameter includes a first time parameter configured to indicate information on a service time of a cell; and sending the target time parameter.

18 Claims, 7 Drawing Sheets

(56)  References Cited

FOREIGN PATENT DOCUMENTS

WO    WO-2022141639 A1 *  7/2022   ............  H04W 48/20
WO    WO-2022198544 A1 *  9/2022   ............  H04W 76/27

OTHER PUBLICATIONS

Machine Translation of WO-2022198544-A1 (Year: 2022).*
Ericsson, "Idle mode aspects for NTN", Jan. 25-Feb. 5, 2021, 3GPP TSG-RAN WG2 Meeting #113 electronic, R2-2100347, pp. 1-10 (Year: 2021).*
LG, "Contents of ephemeris information and remaining idle mode issues", Jan. 25-Feb. 5, 2021, 3GPP TSG-RAN WG2 Meeting #113-e, R2-2100579, pp. 1-4 (Year: 2021).*
Huawei, "Discussion on cell reselection in NTN", Jan. 25-Feb. 5, 2021, 3GPP TSG RAN WG2 #113-e, R2-2101000, pp. 1-3 (Year: 2021).*

ZTE, "Discussion on cell selection and reselection in NTN", Jan. 25-Feb. 5, 2021, 3GPP TSG-RAN WG2 Meeting#113, R2-2101196, pp. 1-8 (Year: 2021).*
International Search Report and Written Opinion of International Application No. PCT/CN2021/083883, dated Dec. 30, 2021, 22 pages.
ZTE Corporation, Sanechips, "Discussion on cell selection and reselection in NTN", 3GPP TSG-RAN WG2 Meeting#113, R2-2101196, Electronic, Jan. 25-Feb. 5, 2021, 8 pages.
Interdigital, "Cell reselection in NTN", 3GPP TSG RAN WG2 Meeting #113e, R2-2101572, eMeeting, Jan. 25-Feb. 5, 2021, 3 pages.
Xiaomi, "Enhancements on cell selection/reselection for earth moving and fixed beans", 3GPP TSG RAN WG2 #113, R2-2100811, eMeeting, Jan. 25-Feb. 5, 2021, 3 pages.
Extended European Search Report Issued in Application No. 21933612.0 dated Mar. 28, 2024, 12 pages.
"Report from [113-e][105][NTN] Idle mode aspects (Nokia)", 3GPP TSG-RAN WG2 Meeting #113, R2-2102015, Nokia, Nokia Shanghai Bell, Elbonia, Online, Jan. 25-Feb. 5, 2021, 22 pages.

* cited by examiner

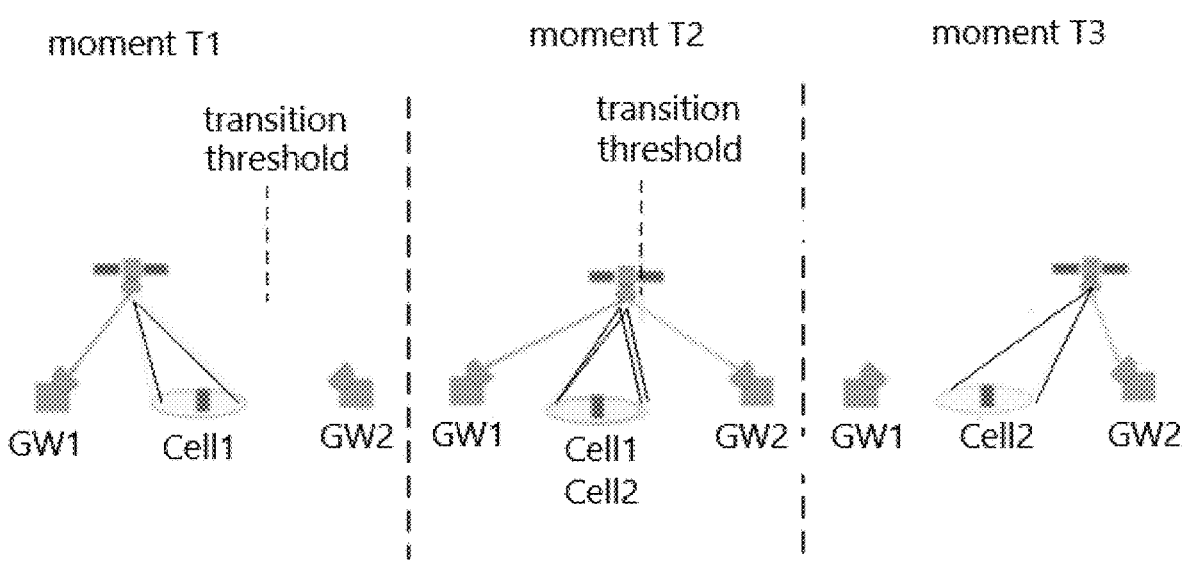

FIG. 1

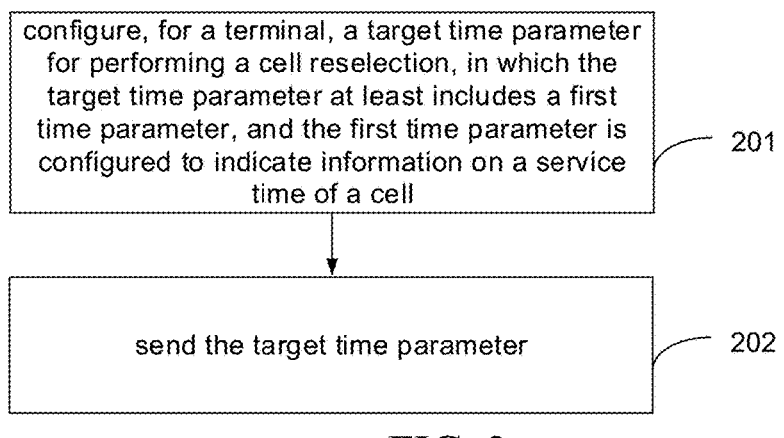

configure, for a terminal, a target time parameter for performing a cell reselection, in which the target time parameter at least includes a first time parameter, and the first time parameter is configured to indicate information on a service time of a cell — 201 send the target time parameter — 202

FIG. 2

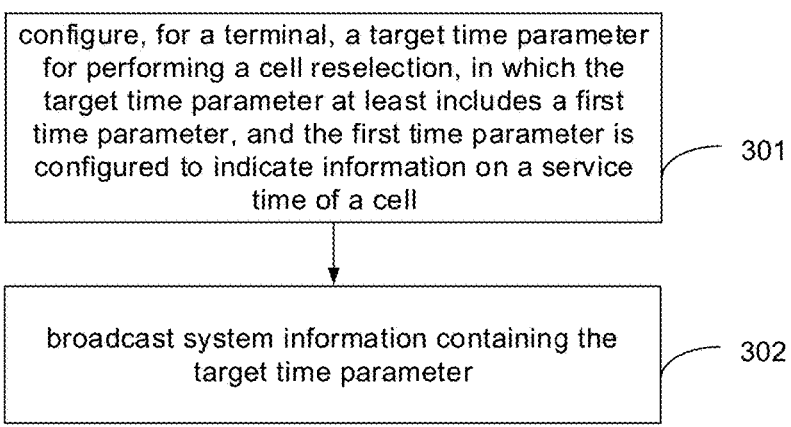

configure, for a terminal, a target time parameter for performing a cell reselection, in which the target time parameter at least includes a first time parameter, and the first time parameter is configured to indicate information on a service time of a cell — 301 broadcast system information containing the target time parameter — 302

FIG. 3

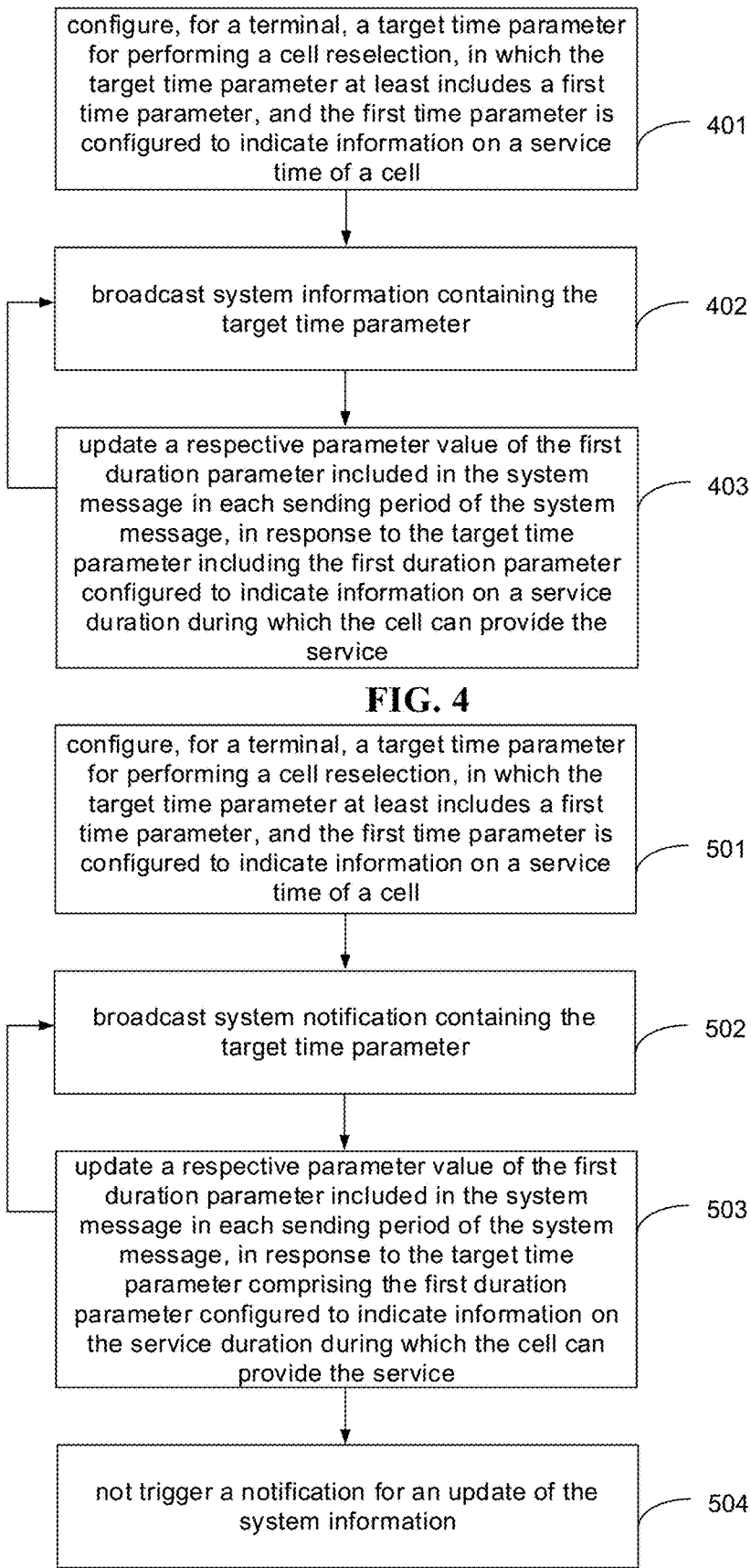

configure, for a terminal, a target time parameter for performing a cell reselection, in which the target time parameter at least includes a first time parameter, and the first time parameter is configured to indicate information on a service time of a cell — 401 broadcast system information containing the target time parameter — 402 update a respective parameter value of the first duration parameter included in the system message in each sending period of the system message, in response to the target time parameter including the first duration parameter configured to indicate information on a service duration during which the cell can provide the service — 403

FIG. 4 configure, for a terminal, a target time parameter for performing a cell reselection, in which the target time parameter at least includes a first time parameter, and the first time parameter is configured to indicate information on a service time of a cell — 501 broadcast system notification containing the target time parameter — 502 update a respective parameter value of the first duration parameter included in the system message in each sending period of the system message, in response to the target time parameter comprising the first duration parameter configured to indicate information on the service duration during which the cell can provide the service — 503 not trigger a notification for an update of the system information — 504

FIG. 5

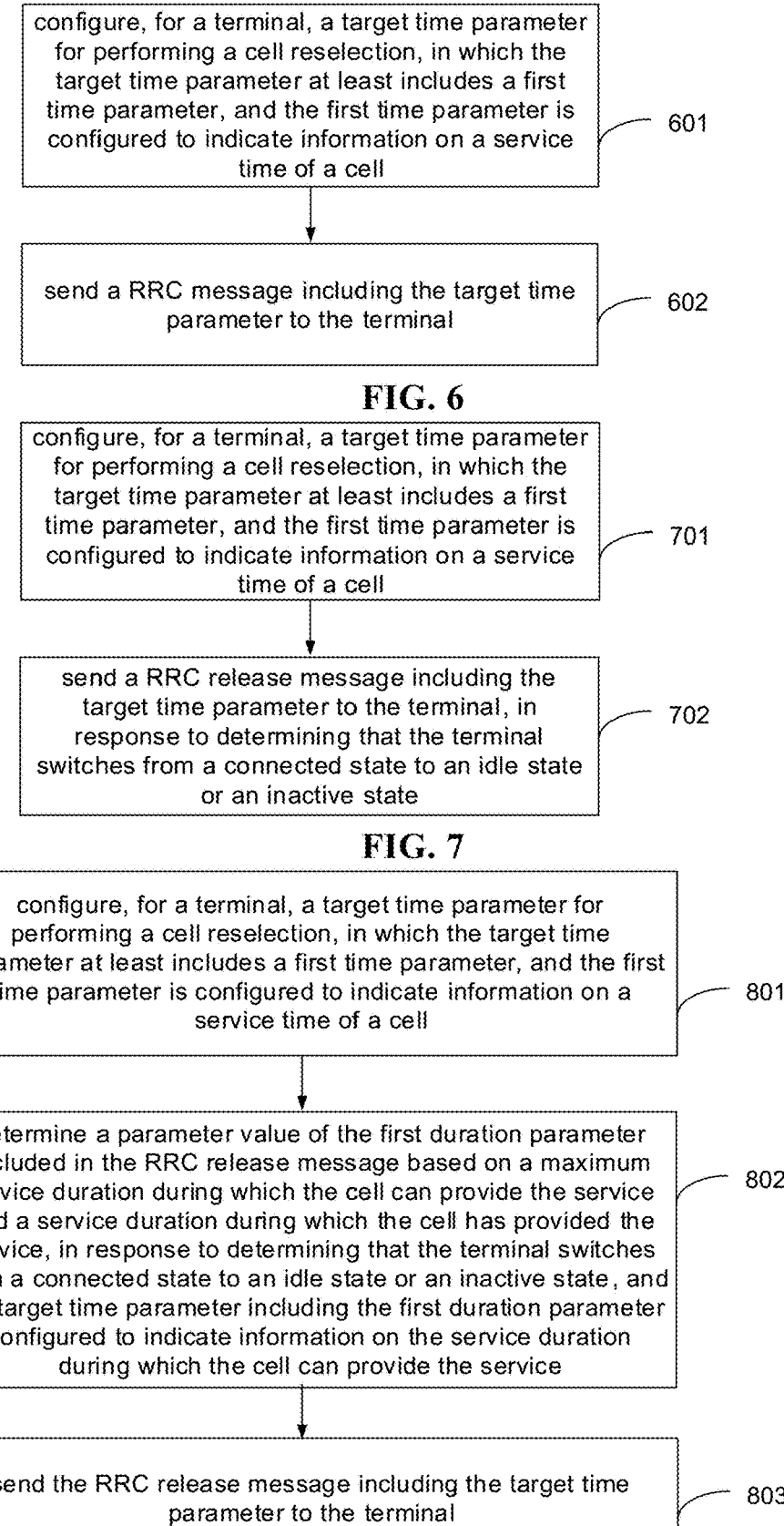

configure, for a terminal, a target time parameter for performing a cell reselection, in which the target time parameter at least includes a first time parameter, and the first time parameter is configured to indicate information on a service time of a cell — 601 send a RRC message including the target time parameter to the terminal — 602

FIG. 6 configure, for a terminal, a target time parameter for performing a cell reselection, in which the target time parameter at least includes a first time parameter, and the first time parameter is configured to indicate information on a service time of a cell — 701 send a RRC release message including the target time parameter to the terminal, in response to determining that the terminal switches from a connected state to an idle state or an inactive state — 702

FIG. 7 configure, for a terminal, a target time parameter for performing a cell reselection, in which the target time parameter at least includes a first time parameter, and the first time parameter is configured to indicate information on a service time of a cell — 801 determine a parameter value of the first duration parameter included in the RRC release message based on a maximum service duration during which the cell can provide the service and a service duration during which the cell has provided the service, in response to determining that the terminal switches from a connected state to an idle state or an inactive state, and the target time parameter including the first duration parameter configured to indicate information on the service duration during which the cell can provide the service — 802 send the RRC release message including the target time parameter to the terminal — 803

FIG. 8

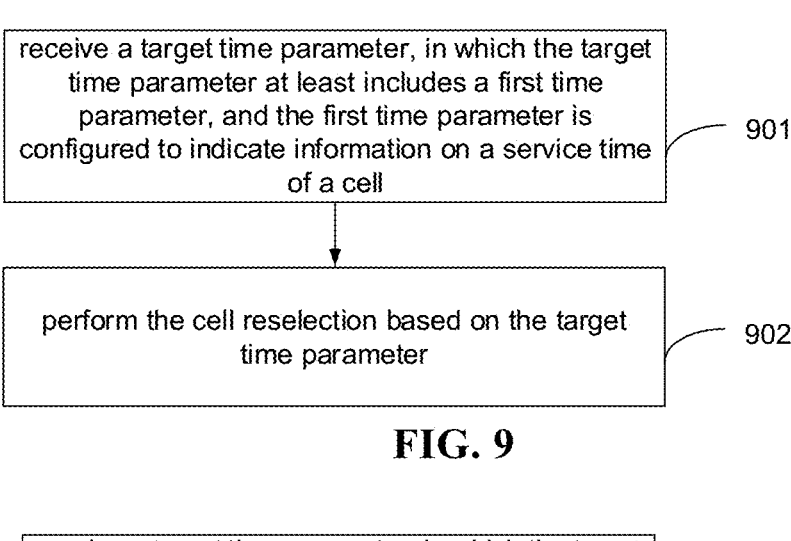

receive a target time parameter, in which the target time parameter at least includes a first time parameter, and the first time parameter is configured to indicate information on a service time of a cell ⟋ 901 perform the cell reselection based on the target time parameter ⟋ 902

FIG. 9

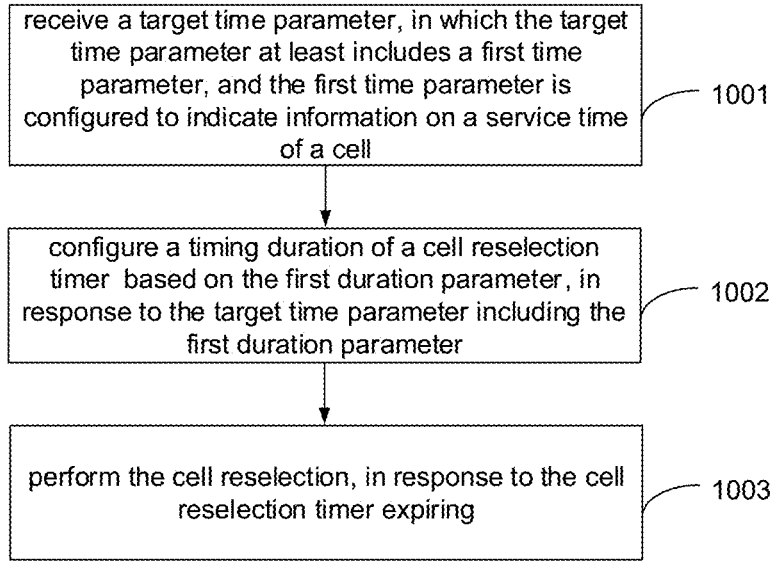

receive a target time parameter, in which the target time parameter at least includes a first time parameter, and the first time parameter is configured to indicate information on a service time of a cell ⟋ 1001 configure a timing duration of a cell reselection timer based on the first duration parameter, in response to the target time parameter including the first duration parameter ⟋ 1002 perform the cell reselection, in response to the cell reselection timer expiring ⟋ 1003

FIG. 10

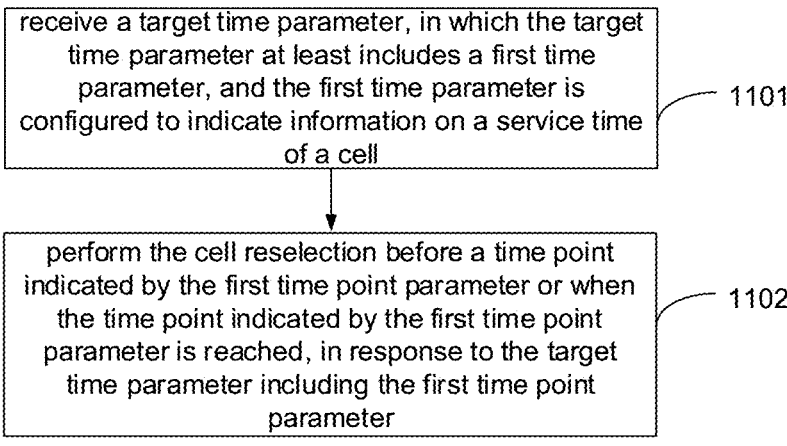

receive a target time parameter, in which the target time parameter at least includes a first time parameter, and the first time parameter is configured to indicate information on a service time of a cell ⟋ 1101 perform the cell reselection before a time point indicated by the first time point parameter or when the time point indicated by the first time point parameter is reached, in response to the target time parameter including the first time point parameter ⟋ 1102

FIG. 11

CELL RESELECTION PARAMETER CONFIGURATION AND CELL RESELECTION METHOD AND DEVICE, AND STORAGE MEDIUM

CROSS-REFERENCE TO RELATED APPLICATION

This application is a national phase of International Application No. PCT/CN2021/083883, filed on Mar. 30, 2021, the content of which is hereby incorporated by reference in its entirety.

TECHNICAL FIELD

The disclosure relates to a field of communications, in particular to a method for configuring a parameter for a cell reselection, a cell reselection method, an apparatus for configuring a parameter for a cell reselection, a cell reselection apparatus, and a storage medium.

BACKGROUND

Currently, for terminals in a Radio Resource Control (RRC) idle state or inactive state, cell reselection can be performed according to S criteria and R criteria. Taking the S criterion as an example, for intra-frequency neighbor (cell) measurements, if a cell signal quality of a serving cell is greater than a signal quality threshold of the intra-frequency neighbor cell, neighbor cell measurement is not required to be carried out. If the cell signal quality of the serving cell is less than the signal quality threshold of the intra-frequency neighbor cell, the terminal needs to carry out the neighbor cell measurement. The way of the inter-frequency neighbor (cell) measurements is similar to the way of the intra-frequency neighbor (cell) measurements. The terminal may likewise perform inter-frequency neighbor (cell) measurement if the cell signal quality of the serving cell is less than a signal quality threshold of the inter-frequency neighbor cell.

SUMMARY

According to a first aspect, a method for configuring a parameter for a cell reselection, performed by a base station, is provided. The method includes:

configuring, for a terminal, a target time parameter for performing a cell reselection, in which the target time parameter includes a first time parameter, and the first time parameter is configured to indicate information on a service time of a cell; and sending the target time parameter.

According to a second aspect, a cell reselection method, performed by a terminal, is provided. The method includes:

receiving a target time parameter, in which the target time parameter includes a first time parameter, and the first time parameter is configured to indicate information on a service time of a cell; and performing a cell reselection based on the target time parameter.

According to a third aspect, a device for configuring a cell reselection parameter is provided. The device includes:

a processor;

a memory configured to store instructions executable by the processor; in which the processor is configured to perform the method for configuring a parameter of cell reselection of any implementation of the first aspect.

According to a fourth aspect of embodiments of the disclosure, a cell reselection device is provided. The device includes:

a processor;

a memory configured to store instructions executable by the processor; in which the processor is configured to perform the cell reselection method of any implementation of the second aspect.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure.

FIG. 1 is a schematic diagram illustrating an interaction scene between a satellite and a ground network in a non-terrestrial networks (NTN) system according to an example embodiment.

FIG. 2 is a schematic flowchart illustrating a method for configuring a parameter for a cell reselection according to an example embodiment.

FIG. 3 is a schematic flowchart illustrating another method for configuring a parameter for a cell reselection according to an example embodiment.

FIG. 4 is a schematic flowchart illustrating yet another method for configuring a parameter for a cell reselection according to an example embodiment.

FIG. 5 is a schematic flowchart illustrating still another method for configuring a parameter for a cell reselection according to an example embodiment.

FIG. 6 is a schematic flowchart illustrating still another method for configuring a parameter for a cell reselection according to an example embodiment.

FIG. 7 is a schematic flowchart illustrating still another method for configuring a parameter for a cell reselection according to an example embodiment.

FIG. 8 is a schematic flowchart illustrating still another method for configuring a parameter for a cell reselection according to an example embodiment.

FIG. 9 is a schematic flowchart illustrating a cell reselection method according to an example embodiment.

FIG. 10 is a schematic flowchart illustrating another cell reselection method according to an example embodiment.

FIG. 11 is a schematic flowchart illustrating yet another cell reselection method according to an example embodiment.

DETAILED DESCRIPTION

Figures 12, 13:
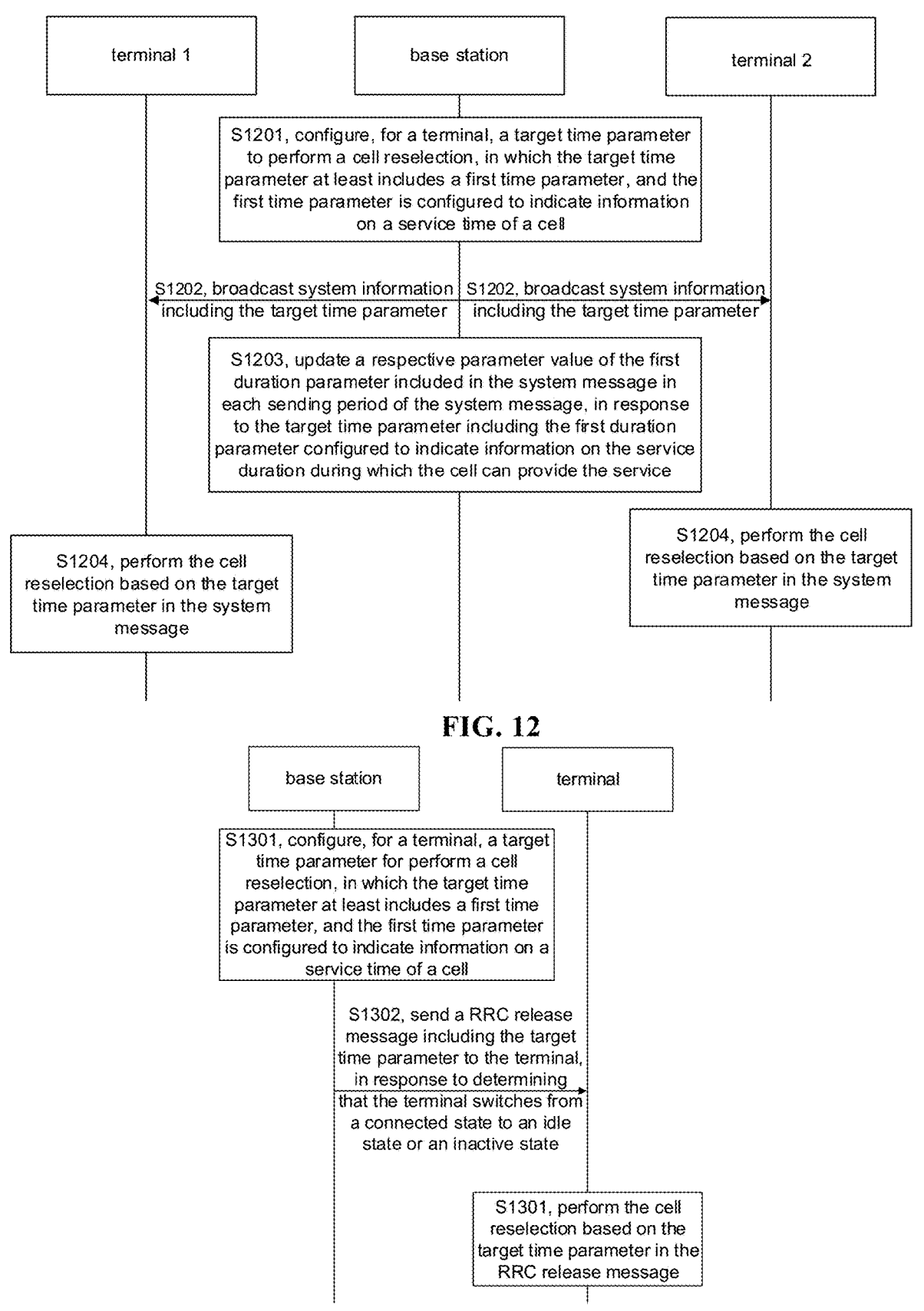
FIG. 12 is a schematic flowchart illustrating still another cell reselection method according to an example embodiment.
FIG. 13 is a schematic flowchart illustrating still another cell reselection method according to an example embodiment.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a" and "the" used in the disclosure and appended claims are also intended to include plural forms, unless the context clearly indicates other meanings. It is also understandable that the term "and/or" as used herein refers to and includes any or all possible combinations of one or more associated listed items.

It is understandable that although the terms "first", "second", and "third" may be used in the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

In a Non-terrestrial Networks (NTN) system, in addition to Geostationary Earth Orbiting (GEO) satellites, feeder link switch is bound to exist as the satellites move. Feed link is a link between a satellite and a ground gateway. During the feeder link switch, the serving cell will be unusable, and if the terminal initiates the measurement on the neighbor cell according to the S criteria, it may cause a problem that the terminal has not yet initiated the measurement of the neighbor cell, but the serving cell is unusable.

Satellites other than GEO satellites are constantly moving relative to the ground. A process of the feeder link switch is illustrated in FIG. 1. A satellite is connected to a Gateway (GW) 1 at the T1 moment. The satellite starts performing the feeder link switch at the T2 moment. At the T2 moment, the satellite may maintain connections with both the GW1 and GW2, and for a terminal in the idle state or inactive state, cell reselection is required to enter from cell 1 to cell 2. At T3 moment, the feeder link switch is completed, and the terminal also completes the cell reselection. Due to the feeder link switch, the cell 1 will be unusable at the T2 moment, which causes that the terminal has not started measuring neighbor cells yet. Therefore, when entering the cell 2 through the cell reselection, the cell 1 will be unable to provide any service to the terminal.

In order to solve the above problems, the disclosure provides a solution for configuring a parameter for a cell reselection and a cell reselection solution.

The following will first introduce the solution for configuring a parameter for a cell reselection of the disclosure from the base station side.

Embodiments of the disclosure provide a method for configuring a parameter for a cell reselection. As illustrated in FIG. 2, FIG. 2 is a schematic flowchart illustrating a method for configuring a parameter for a cell reselection according to an example embodiment. This method can be performed by a base station. The method includes the following.

At step 201, a target time parameter for performing a cell reselection is configured for a terminal. The target time parameter at least includes a first time parameter, and the first time parameter is configured to indicate information on a service time of a cell.

At step 202, the target time parameter is sent.

In the above embodiments, the purpose of configuring, on the network side for the terminal, the target time parameter for performing the cell reselection is realized.

In an implementation, the first time parameter may include at least one of: a first duration parameter and a first time point parameter.

The first duration parameter is configured to indicate information on a service duration during which the cell can provide a service. For example, the first duration parameter is configured to indicate that the service duration during which the cell can provide the service is 2 hours.

The first time point parameter is configured to indicate information on a time point when the cell stops providing the service. The cell will stop providing the service at the moment indicated by the first time point parameter. In some examples, the first time point parameter indicates an absolute time, such as Universal Time Coordinated (UTC). For example, if the first time point parameter indicates 9:00 am, then the cell will stop providing the service at 9:00 am.

In the above embodiments, the first time parameter may represent the first duration parameter corresponding to the service duration during which the cell can provide the service or the first time point parameter corresponding to the time point when the cell stops providing the service, which is easy to implement and highly usable.

In some optional embodiments, as illustrated in FIG. 3, FIG. 3 is a schematic flowchart illustrating a method for configuring a parameter for a cell reselection according to an example embodiment. The method can be performed by a base station. The method includes the following.

At step 301, a target time parameter for performing the cell reselection is configured for a terminal. The target time parameter at least includes a first time parameter, and the first time parameter is configured to indicate information on a service time of a cell.

At step 302, system information containing the target time parameter is broadcasted.

In the above embodiments, the base station may broadcast the system information including the target time parameter, so that the terminal receives the target time parameter, to achieve the purpose of configuring, on the network side for the terminal, the target time parameter for performing the cell reselection.

In some optional embodiments, as illustrated in FIG. 4, FIG. 4 is a schematic flowchart illustrating a method for configuring a parameter for a cell reselection according to an example embodiment. The method can be performed by a base station. The method includes the following.

At step 401, a target time parameter for performing the cell reselection is configured for a terminal. The target time parameter at least includes a first time parameter, and the first time parameter is configured to indicate information on a service time of a cell.

At step 402, system information containing the target time parameter is broadcasted.

In the embodiments of the disclosure, the base station broadcasts the system information, such that the terminal receives the target time parameter configured by the network side for the terminal.

At step 403, a parameter value of the first duration parameter included in the system information is updated in each sending period of the system information, in response to the target time parameter including the first duration parameter configured to indicate information on the service duration during which the cell can provide the service.

In the embodiments of the disclosure, when the base station sends the target time parameter to the terminal via the system information, if the target time parameter includes the first duration parameter, the base station needs to update the respective parameter value of the first duration parameter included in the system information in each sending period of the system information.

In an implementation, the base station may determine the respective parameter value of the first duration parameter included in the system information in each sending period, based on a maximum service duration during which the cell can provide the service and a respective period duration of each sending period of the system information.

The base station may determine the respective parameter value T of the first duration parameter included in the system information for each sending period according to the following equation:

$$T = T\,max - nT' \qquad \text{(equation 1)}$$

where T max represents the maximum service duration during which the cell is capable of providing the service, T' represents the respective period duration of each sending period, n represents the number of sending periods of the system information that have been passed since the cell started providing the service, and n is a natural number.

For example, in the sending periods, the parameter values T of the first duration parameter included in the system information can respectively be: T max, T max–T', T max– 2T', . . . and so on, until the cell stops providing the service.

In the above embodiments, the base station can broadcast the system information, so that the terminal receives the target time parameter. The base station updates the respective parameter value of the first duration parameter included in the system information in each sending period of the system information, so that the terminal entering the cell in any sending period can accurately obtain, through the system information, the time information of the service provided by the cell.

In this embodiment, when the base station sends the target time parameter to the terminal through the system information, if the target time parameter includes the first time point parameter, since the first time point parameter indicates an absolute time and thus the first time point parameter will not change with the number of sending periods of the system information that have been passed, the base station does not need to update the parameter value of the first time point parameter included in the system information.

In the above embodiments, the base station can accurately provide, to the terminal through the system information, the time information when the cell provides the service that is configured for the terminal, which has high usability.

In some optional embodiments, as illustrated in FIG. 5, FIG. 5 is a schematic flowchart illustrating a method for configuring a parameter for a cell reselection according to an example embodiment. The method may be performed by a base station. The method includes the following.

At step 501, a target time parameter for performing the cell reselection is configured for a terminal. The target time parameter at least includes a first time parameter, and the first time parameter is configured to indicate information on a service time of a cell.

At step 502, system information containing the target time parameter is broadcasted.

In the embodiments of the disclosure, the base station may broadcast the system information, so that the terminal receives the target time parameter.

At step 503, a respective parameter value of the first duration parameter included in the system information is updated in each sending period of the system information, in response to the target time parameter including the first duration parameter configured to indicate information on the service duration during which the cell can provide the service.

At step 504, the base station does not trigger a notification for an update of the system information.

According to the related arts, when the system information is updated, terminals in the cell need to be notified of this. However, in the embodiments of the disclosure, if the base station updates the parameter value of the first duration parameter included in the system information, the base station does not trigger a notification for an update of the system information. That is, after the terminal enters the cell and determines the parameter value of the first duration parameter included in the system information by receiving the system information, the terminal performs the cell reselection based on the parameter value of the first duration parameter. In this process, from the perspective of the terminal, the parameter value of the first duration parameter never changed. Therefore, even if the network side updates the parameter value of the first duration parameter in the system information in the next sending period of the system information, there is no need to notify the terminal of this, that is, there is no need to trigger the notification for the update of the system information.

In the above embodiments, after the base station updates the parameter value of the first duration parameter included in the system information, the base station will not notify the terminal that the system information has been updated, thereby ensuring that the terminal can accurately obtain the time information of the service provided by the cell, which has highly usability.

In some optional embodiments, as illustrated in FIG. 6, FIG. 6 is a schematic flowchart illustrating a method for configuring a cell reselection parameter according to an example embodiment. The method may be performed by a base station. The method includes the following.

At step 601, a target time parameter for performing the cell reselection is configured for a terminal. The target time parameter at least includes a first time parameter, and the first time parameter is configured to indicate information on a service time of a cell.

At step 602, a RRC message including the target time parameter is sent to the terminal.

In the above embodiments, the base station can send, through the RRC message to the terminal, the time information when the cell provides the service that is configured by the base station for the terminal, which has high usability.

In some optional embodiments, as illustrated in FIG. 7, FIG. 7 is a schematic flowchart illustrating a method for configuring a parameter for a cell reselection according to an example embodiment. The method may be performed by a base station. The method includes the following.

At step 701, a target time parameter for performing cell reselection is configured for a terminal. The target time parameter at least includes a first time parameter, and the first time parameter is configured to indicate information on a service time of a cell.

At step 702, a RRC release message including the target time parameter is sent to the terminal, in response to determining that the terminal switches from a connected state to an idle state or an inactive state.

In the embodiments of the disclosure, the base station may send the RRC release message including the target time parameter to the terminal when determining that the terminal switches from the connected state to the idle state or the inactive state.

In the above embodiments, when the terminal switches from the connected state to other states, the base station can provide, through the RRC release message to the terminal, the time information when the cell provides the service that is configured for the terminal by the base station, which has high usability.

In some optional embodiments, as illustrated in FIG. 8, FIG. 8 is a schematic flowchart illustrating a method for configuring a parameter for a cell reselection according to an example embodiment. The method may be performed by a base station. The method includes the following.

At step 801, a target time parameter for performing a cell reselection is configured for a terminal. The target time parameter at least includes a first time parameter, and the first time parameter is configured to indicate information on a service time of a cell.

At step 802, a parameter value of the first duration parameter included in the RRC release message is determined based on the maximum service duration during which the cell can provide the service and a service duration during which the cell has provided the service, in response to determining that the terminal switches from a connected state to an idle state or an inactive state, and the target time parameter includes the first duration parameter configured to indicate information on the service duration during which the cell can provide the service.

In the embodiments of the disclosure, the parameter value T of the first duration parameter included in the RRC release message may be a difference between the maximum service duration T max during which the cell can provide the service and the service duration Tser during which the cell has provided the service, that is, T=T max−Tser.

At step 803, the RRC release message including the target time parameter is sent to the terminal.

In the above embodiments, the base station may send the RRC release message including the target time parameter to the terminal when determining that the terminal switches from the connected state to the idle state or the inactive state. The base station can accurately provide, through the RRC message to the terminal, the time information when the cell provides the service that is configured for the terminal, which has high usability.

In some optional embodiments, in addition to the above first time parameter, the target time parameter may also include a second time parameter, and the second time parameter may be configured to indicate information on a service time of a neighbor cell.

In an implementation, the second time parameter includes at least one of: a second duration parameter, a second time point parameter, or a third time point parameter.

The second time parameter is configured to indicate the information on a service duration during which the neighbor cell is going to provide the service to the terminal. The second time point parameter is configured to indicate information on a start time point when the neighbor cell starts to provide the service. The third time point parameter is configured to indicate information on a time point when the neighbor cell stops providing the service. The neighbor cell will stop providing the service at the time point indicated by the third time point parameter. The second time point parameter and the third time point parameter may be absolute time.

In the above embodiments, the target time parameter, configured by the base station for the terminal, for performing the cell reselection includes not only the information on the service time of the cell, but also the information on the service time of the neighbor cell. Therefore, it is ensured that the terminal can perform the cell reselection in time based on the target time parameter.

It is noteworthy that in this embodiment of the disclosure, if the base station broadcasts the system information including the target time parameter and the target time parameter includes the second time parameter, the parameter value of the second time parameter does not need to be updated as the sending periods of the system information are passed.

Similarly, if the base station sends the RRC message including the target time parameter to the terminal and the target time parameter includes the second time parameter, the second time parameter remains unchanged.

The cell reselection solution according to the disclosure will be introduced below from the perspective of the terminal side.

As illustrated in FIG. 9, FIG. 9 is a schematic flowchart illustrating a cell reselection method according to an example embodiment. The method may be performed by a terminal. The method includes the following.

At step 901, a target time parameter is received. The target time parameter at least includes a first time parameter, and the first time parameter is configured to indicate information on a service time of a cell.

At step 902, a cell reselection is performed based on the target time parameter.

In the embodiments of the disclosure, neighbor cell measurement can be performed based on the target time parameter. The cell reselection can be performed according to a result of the neighbor cell measurement. The neighbor cell measurement includes, but is not limited to, at least one of: obtaining a neighbor cell identifier (ID), reading system information of the neighbor cell, and measuring a signal quality of the neighbor cell.

In the above embodiments, the terminal may perform the cell reselection based on the target time parameter configured by the base station for the terminal. The target time parameter at least includes the first time parameter configured to indicate the information on the service time of the cell. Therefore, it is ensured that the terminal can carry out the cell reselection in time, which ensures the normal operation of the service by the terminal.

In an implementation manner, the first time parameter includes at least one of: a first duration parameter configured to indicate information on a service duration during which the cell can provide a service, or a first time point parameter configured to indicate information on a time point when the cell stops providing the service.

In some embodiments, as illustrated in FIG. 10, FIG. 10 is a schematic flowchart illustrating a cell reselection method according to an example embodiment. The method may be performed by a terminal. The method includes the following.

At step 1001, a target time parameter is received. The target time parameter at least includes a first time parameter, and the first time parameter is configured to indicate information of a service time of a cell.

At step 1002, a timing duration of a cell reselection timer is configured based on the first duration parameter, in response to the target time parameter including the first duration parameter.

In an implementation, if the system information received by the terminal includes the first duration parameter. The terminal configures that the timing duration of the cell reselection timer is the parameter value of the first duration parameter in the system information.

In another implementation, if the RRC release message received by the terminal includes the first duration parameter, the terminal may configure that the timing duration of the cell reselection timer is the parameter value of the first duration parameter in the RRC release message.

In another implementation, the parameter value of the first duration parameter included in the system information is configured by the base station for all terminals in the cell. The parameter value of the first duration parameter in the RRC release message is configured by the base station for the terminal, and different parameter values of the first duration parameter in the RRC release message correspond to different terminals.

Correspondingly, when the terminal receives not only the system information including the first duration parameter, but also the RRC release message including the first duration parameter, the terminal configures that the timing duration of the cell reselection timer is the parameter value of the first duration parameter in the RRC release message.

At step 1003, the cell reselection is performed in response to the cell reselection timer expiring.

In the embodiments of the disclosure, the terminal may immediately perform the neighbor cell measurement when the cell reselection timer expires. Based on the result of the neighbor cell measurement, the cell reselection is performed. The neighbor cell measurement includes, but is not limited to, at least one of: obtaining a neighbor cell identifier (ID), reading system information of the neighbor cell, or measuring a signal quality of the neighbor cell.

In the above embodiments, the terminal can carry out the cell reselection based on the first duration parameter in the target time parameter configured by the base station, to realize the purpose of performing the cell reselection in time and ensure the normal operation of the service by the terminal.

In an implementation, the terminal may enter the cell through the cell reselection, and when the terminal receives the system information including the first duration parameter, the terminal triggers to start the cell reselection timer. The timing duration of the cell reselection timer is the parameter value of the first duration parameter in the system information.

In another implementation, the terminal switches from the connected state to the idle state or the inactive state, and when the terminal receives the RRC release message including the first duration parameter, the terminal can trigger to start the cell reselection timer. The timing duration of the cell reselection timer is the parameter value of the first duration parameter in the RRC release message.

In another implementation, the terminal switches from the connected state to the idle state or the non-active state, when the received RRC release message does not include the first duration parameter, but the received system information includes the first duration parameter, at this time, the terminal triggers to start the cell reselection timer. The timing duration of the cell reselection timer is the parameter value of the first duration parameter in the system information.

Certainly, if the terminal switches from the connected state to the idle state or the inactive state, when the received RRC release message includes the first duration parameter and the received system information includes the first duration parameter, the terminal triggers to start the cell reselection timer, and the timing duration of the cell reselection timer is the parameter value of the first duration parameter in the RRC release message.

In the above embodiments, the terminal may trigger to start the cell reselection timer and set the timing duration according to its own state, thereby ensuring that cell reselection can be carried out in a timely manner based on the target time parameter configured by the base station.

In some embodiments, as illustrated in FIG. 11, FIG. 11 is a schematic flowchart illustrating a cell reselection method according to an example embodiment. The method may be performed by a terminal. The method includes the following.

At step 1101, a target time parameter is received. The target time parameter at least includes a first time parameter, and the first time parameter is configured to indicate information on a service time of a cell.

At step 1102, cell reselection is performed before a time point indicated by a first time point parameter or when the time point indicated by the first time point parameter is reached, in response to the target time parameter including the first time point parameter.

In the embodiments of the disclosure, the terminal may perform the neighbor cell measurement before the time point indicated by the first time point parameter or when the time point indicated by the first time point parameter is reached, and perform the cell reselection based on the result of the neighbor cell measurement. The neighbor cell measurement includes, but is not limited to, at least one of: obtaining a neighbor cell ID, reading system information of the neighbor cell, and measuring a signal quality of the neighbor cell.

In the above embodiments, the terminal can carry out the cell reselection base on the first time point parameter in the target time parameter configured by the base station, to realize the purpose of carrying out the cell reselection in a timely manner and ensure the normal operation of the service by the terminal.

In some optional embodiments, the target time parameter may further includes the second time parameter. The second time parameter is configured to indicate information on a service time of a neighbor cell.

In some examples, the second time parameter includes at least one of: a second duration parameter configured to indicate information on the service duration during which the neighbor cell is going to provide the service to the terminal, a second time point parameter configured to indicate information on a start time point when the neighbor cell starts to provide the service, or a third time point parameter configured to indicate information on a time point when the neighbor cell stops providing the service.

In some optional embodiments, if the target time parameter further includes the second duration parameter, the terminal may determine candidate neighbor cells for the cell reselection based on the second duration parameter, and determine the target neighbor cell to be switched to based on at least one of the candidate neighbor cells.

In an implementation, the terminal may select the neighbor cell with the longest one among service durations indicated by the second duration parameter as the target neighbor cell of the cell reselection.

In the above embodiments, the terminal may determine the target neighbor cell to be switched to of the cell reselection based on the second time duration parameter, included in the target time parameter, configured to indicate duration information that the neighbor cell provides the service, so that a more suitable target neighbor cell can be selected based on the target time parameter configured by the base station when performing the cell reselection, which has a high usability.

In some optional implementations, if the target time parameter further includes at least one of the second time point parameter or the third time point parameter, the terminal determines the target neighbor cell to be switched to in performing the cell reselection based on at least one of the second time point parameter or the third time point parameter.

In an implementation, if the time point indicated by the second time point parameter of each neighbor cell is located after the time point when the current cell stops providing the service, the terminal may select a neighbor cell corresponding to the closest time point indicated by the second time point parameter to the time point when the current cell stops providing the service as the target neighbor cell.

In another implementation, if the time point indicated by the second time point parameter of at least one neighbor cell is located before the time point at which the current cell stops providing the service, the terminal may select a neighbor cell with the best cell signal quality among these neighbor cells as the target neighbor cell.

In another implementation, the terminal may select a neighbor cell corresponding to the latest time point indicated by the third time point parameter as the target neighbor cell.

The above description is only for the illustrative purposes, and schemes in which the terminal may determine the target neighbor cell according to the time point parameter when the neighbor cell provides the service or the time point parameter when the neighbor cell stops providing the service shall all fall within the scope of protection of the disclosure.

In the above embodiments, the terminal may determine the target neighbor cell to be switched to of the cell reselection based on at least one of the second time point parameter or the third time point parameter included in the target time parameter, such that a more suitable target neighbor cell is selected based on the target time parameter configured by the base station when carrying out the cell reselection, which has a high usability.

In some optional embodiments, the timing duration remains unchanged after the cell reselection timer of the terminal is started. Even if the base station side updates the parameter value of the first duration parameter in the system information, the terminal does not change the timing duration of the cell reselection timer.

In some embodiments, as illustrated in FIG. 12, FIG. 12 is a schematic flowchart illustrating a cell reselection method according to an example embodiment. The method includes the following.

At step 1201, a base station configures, for a terminal, a target time parameter for performing a cell reselection. The target time parameter at least includes a first time parameter, and the first time parameter is configured to indicate information on a service time of a cell.

At step 1202, the base station broadcasts system information including the target time parameter.

At step 1203, the base station updates a respective parameter value of the first duration parameter included in the system information in each sending period of the system information, in response to the target time parameter including the first duration parameter configured to indicate information on a service duration during which the cell can provide a service.

The step 1203 is an optional step. If the target time parameter does not include the first duration parameter, but includes the first time point parameter, the base station does not need to update the parameter value of the first time point parameter included in the system information.

In the embodiments of the disclosure, the base station does not trigger a notification for an update of the system information (not illustrated in FIG. 12) after updating the parameter value of the first duration parameter included in the system information.

At step 1204, the terminal performs the cell reselection based on the target time parameter in the system information.

In the embodiments of the disclosure, if the target time parameter includes the first duration parameter, the terminal may configure that the timing duration of the cell reselection timer is the parameter value of the first duration parameter in the system information. When the cell reselection timer expires, the neighbor cell measurement will be performed immediately, and the cell reselection will be carried out according to the result of the neighbor cell measurement.

In the embodiments of the disclosure, if the target time parameter includes the first time point parameter, the terminal may perform the neighbor cell measurement before the time point indicated by the first time point parameter or when the time point indicated by the first time point parameter is reached and perform the cell reselection according to the result of the neighbor cell measurement.

In the above embodiments, the base station may broadcast the system information including the target time parameter, so that the terminal can receive the target time parameter, to realize the purpose of configuring, by the network side for the terminal, the target time parameter for performing the cell reselection. Further, the terminal may perform the cell reselection base on the received target time parameter, to ensure that the terminal can perform the cell reselection in a timely manner and ensure the normal operation of the service by the terminal.

In some embodiments, as illustrated in FIG. 13, FIG. 13 is a schematic flowchart illustrating a cell reselection method according to an example embodiment. The method includes the following.

At step 1301, a base station configures, for a terminal, a target time parameter for performing a cell reselection. The target time parameter at least includes a first time parameter, and the first time parameter is configured to indicate information on a service time of the cell.

At step 1302, the base station sends a RRC release message including the target time parameter to the terminal, in response to determining that the terminal switches from a connected state to an idle state or an inactive state.

If the target time parameter includes the first duration parameter, then the parameter value of the first duration parameter included in the RRC release message is the difference between the maximum service duration during which the cell can provide the service and a service duration during which the cell has provided the service.

At step 1303, the terminal performs the cell reselection based on the target time parameter in the RRC release message.

In the embodiments of the disclosure, the terminal performs the cell reselection based on the target time parameter in the RRC release message and the way of performing the cell reselection is the same as the manner described in step 1204, which will not be repeated here.

In the above embodiments, the base station may send the RRC message including the target time parameter to the terminal, so that the terminal can receive the target time parameter, to realize the purpose of configuring, by the network side for the terminal, the target time parameter for performing the cell reselection. Further, the terminal may perform the cell reselection based on the received target time parameter, to ensure that the terminal can perform the cell reselection in a timely manner and ensure the normal operation of the service by the terminal.

Corresponding to the foregoing embodiments of the method for configuring a parameter for a cell reselection, the disclosure also provides embodiments of an apparatus for configuring a parameter for a cell reselection.

Figure 14:
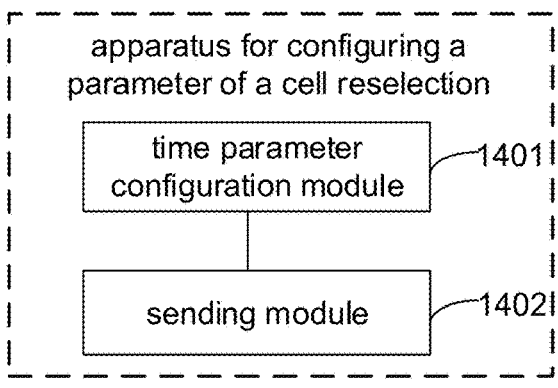
FIG. 14 is a block diagram illustrating an apparatus for configuring a parameter for a cell reselection according to an example embodiment.

As illustrated in FIG. 14, FIG. 14 is a block diagram illustrating an apparatus for configuring a parameter for a cell reselection according to an example embodiment. The apparatus is applied to a base station. The apparatus includes: a time parameter configuration module 1401 and a sending module 1401.

The time parameter configuration module 1401 is configured to configure, for a terminal, a target time parameter for performing a cell reselection. The target time parameter at least includes a first time parameter, and the first time parameter is configured to indicate information on a service time of a cell.

The sending module 1401 is configured to send the target time parameter.

Figure 15:
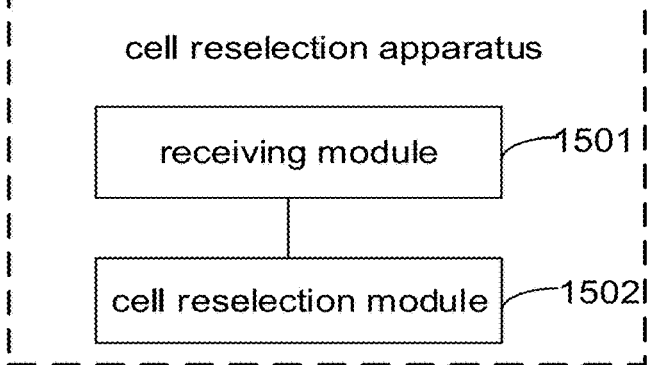
FIG. 15 is a block diagram illustrating a cell reselection apparatus according to an example embodiment.

As illustrated in FIG. 15, FIG. 15 is a block diagram illustrating a cell reselection apparatus according to an example embodiment. The apparatus is applied to a terminal. The apparatus includes: a receiving module 1501 and a cell reselection module 1502.

The receiving module 1501 is configured to receive a target time parameter. The target time parameter at least includes a first time parameter, and the first time parameter is configured to indicate information on a service time of a cell.

The cell reselection module 1502 is configured to perform a cell reselection based on the target time parameter.

As for the apparatus embodiments, since they basically corresponds to the method embodiments, for relevant parts, refer to the part of the description of the method embodiments. The apparatus embodiments described above are only illustrative. The units described above as separate components may or may not be physically separated. The components shown as units may or may not be physical units, that is, they may be located in a place, or can also be distributed to multiple network elements. Part or all of the modules can be selected according to actual needs to achieve the purpose of the disclosed solution. The solutions of the disclosure can be understood and implemented by those skilled in the art without inventive work.

Correspondingly, the disclosure also provides a computer-readable storage medium, having computer programs stored thereon. The computer programs are configured to perform any of the cell reselection method performed by the base station side.

Correspondingly, the disclosure also provides a computer-readable storage medium, having computer programs stored thereon. The computer programs are configured to perform any of the method for configuring a cell reselection parameter performed by the terminal side.

Correspondingly, the disclosure also provides a device for configuring a parameter for a cell reselection. The device includes:

a processor; and a memory configured to store instructions executable by the processor.

The processor is configured to perform any of the method for configuring a parameter for a cell reselection performed by the base station side.

Figure 16:
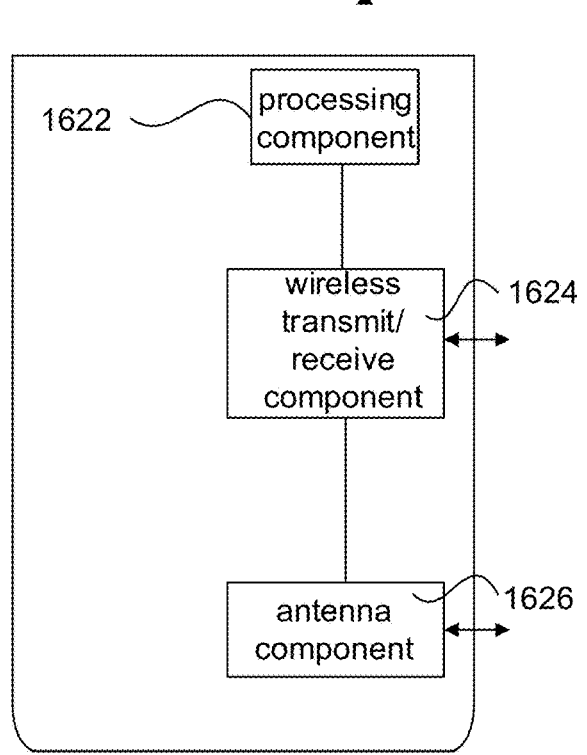
FIG. 16 is a schematic diagram illustrating a device for configuring a parameter for a cell reselection according to an example embodiment.

As illustrated in FIG. 16, FIG. 16 is a schematic diagram illustrating a cell reselection device 1600 according to an example embodiment. The device 1600 may be provided as a base station. As illustrated in FIG. 16, the device 1600 includes: a processing component 1622, a wireless transmit/receive component 1624, an antenna component 1626, and a signal processing portion specific to a wireless interface. The processing component 1622 may further include one or more processors.

One of the processors in the processing component 1622 may be configured for performing the method of configuring a cell reselection parameter described above for the base station side.

Correspondingly, the disclosure also provides a cell reselection device. The device includes:

a processor; and a memory configured to store instructions executable by the processor.

The processor is configured to perform the cell reselection method performed by the terminal side.

Figure 17:
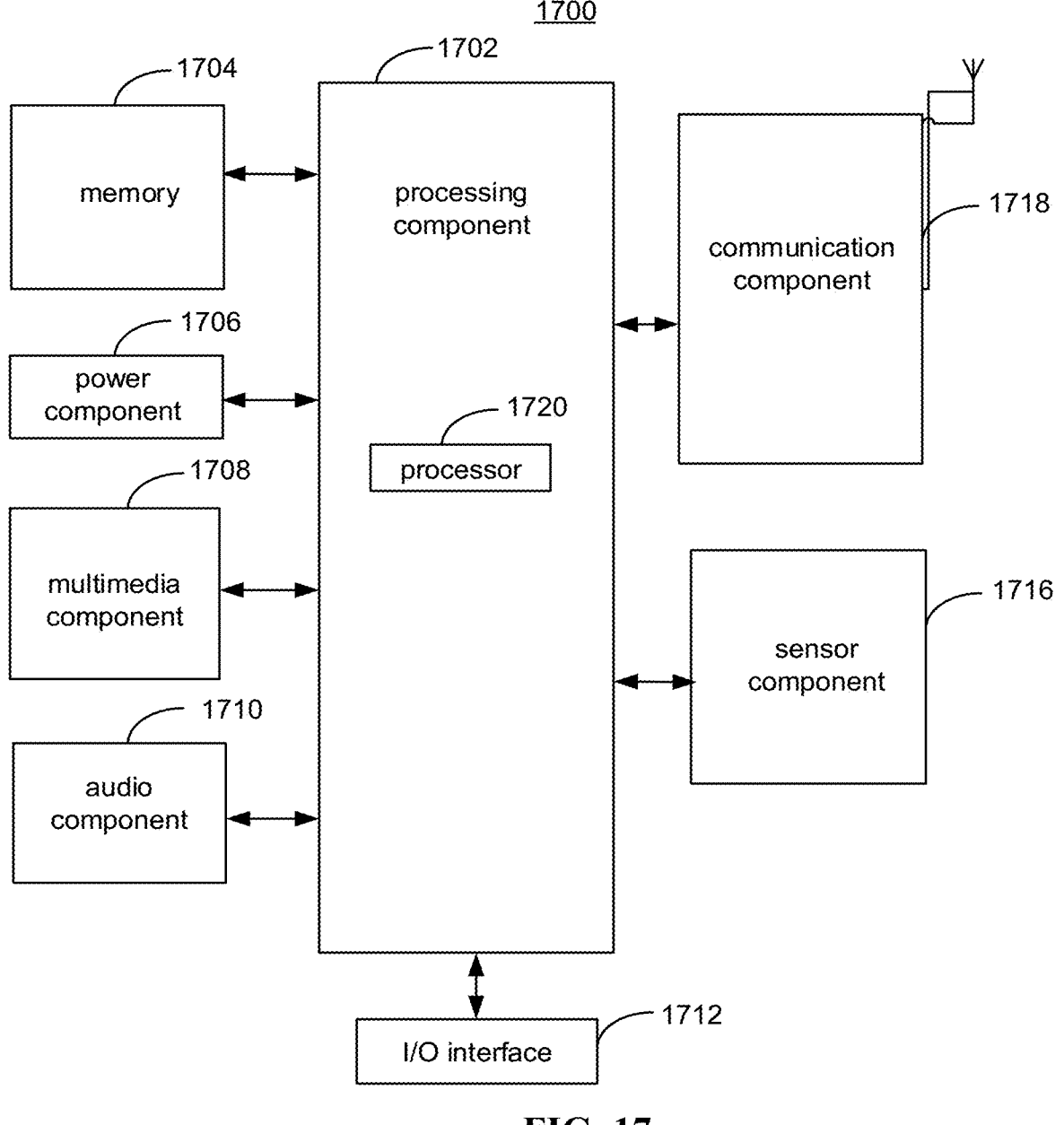
FIG. 17 is a schematic diagram illustrating a cell reselection device according to an example embodiment.

FIG. 17 is a block diagram illustrating an electronic device 1700 illustrated according to an example embodiment. For example, the electronic device 1700 may be a terminal such as a cell phone, a tablet computer, an e-book reader, a multimedia playback device, a wearable device, a vehicle terminal, an iPad, a smart TV, and the like.

As illustrated in FIG. 17, the device 1700 may include one or more of the following components: a processing component 1702, a memory 1704, a power component 1706, a multimedia component 1708, an audio component 1710, an input/output (I/O) interface 1712, a sensor component 1716, and a communication component 1718.

The processing component 1702 typically controls overall operations of the device 1700, such as the operations associated with display, telephone call, data communication, camera operation, and recording operation. The processing component 1702 may include one or more processors 1720 to perform instructions to implement all or part of the steps in the above described cell reselection method. Moreover, the processing component 1702 may include one or more modules which facilitate the interaction between the processing component 1702 and other components. For example, the processing component 1702 may include a multimedia module to facilitate the interaction between the multimedia component 1708 and the processing component 1702. For another example, the processing component 1702 may read executable instructions from the memory to implement the steps of the cell reselection method provided by the embodiments described above.

The memory 1704 is configured to store various types of data to support the operation of the device 1700. Examples of such data include instructions for any applications or methods operated on the device 1700, contact data, phonebook data, messages, pictures, videos, etc. The memory 1704 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read-Only Memory (PROM), a Read Only Memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some embodiments, the multimedia component 1708 includes a front-facing camera and/or a rear-facing camera. When the device 1700 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1710 is configured to output and/or input audio signals. For example, the audio component 1710 includes a microphone (MIC) configured to receive an external audio signal when the device 1700 is in an operation mode, such as a calling mode, a recording mode, and a voice recognition mode. The received audio signal may be further stored in the memory 1704 or transmitted via the communication component 1718. In some embodiments, the audio component 1710 further includes a speaker to output audio signals.

The I/O interface 1712 provides an interface between processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of a user contact with the device 1700, an orientation or an acceleration/deceleration of the device 1700, and a change in temperature of the device 1700. The sensor component 1716 may include a proximity sensor configured to detect the presence of nearby objects without any physical contact. The sensor component 1716 may also include a light sensor, such as a Complementary Metal Oxide Semiconductor (CMOS) or Charge-Coupled Device (CCD) image sensor, for use in imaging applications. In some embodiments, the sensor component 1716 may also include an accelerometer sensor, a gyroscope sensor, a magnetic sensor, a pressure sensor, or a temperature sensor.

The communication component 1718 is configured to facilitate communication, wired or wirelessly, between device 1700 and other devices. The device 1700 can access a wireless network based on a communication standard, such as WiFi, 2G, 3G, 4G, 5G or 6G, or a combination thereof. In an example embodiment, the communication component 1718 receives a broadcast signal from an external broadcast management system or broadcast associated information via a broadcast channel. In an example embodiment, the communication component 1718 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the example embodiment, the device 1700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, for performing the above described cell reselection method.

In the example embodiments, there is also provided a non-transitory computer readable storage medium including instructions, such as the memory 1704, executable by the processor 1720 in the device 1700, for implementing the above cell reselection method. For example, the non-transitory computer-readable storage medium may be a ROM, a Random Access Memory (RAM), a CD-ROM, a magnetic tape, a floppy disc, and an optical data storage device.

In the disclosure, the base station configures, for the terminal, the target time parameter for performing the cell reselection. The target time parameter at least includes the first time parameter configured to indicate the information on the service time of the cell. The base station may send the target time parameter to the terminal, so that the terminal can perform the cell reselection based on the received target time parameter, to achieve the purpose that the network side configures, for the terminal, the target time parameter for performing the cell reselection, thereby ensuring that the terminal can perform the cell reselection in a timely manner and ensuring the normal operation of the service by the terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples are considered as illustrative purposes only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for configuring a parameter for a cell reselection, performed by a base station, comprising:
   configuring, for a terminal, a target time parameter for performing the cell reselection, wherein the target time parameter comprises a first time parameter configured to indicate information on a service time of a cell; and
   sending the target time parameter;
   wherein sending the target time parameter comprises:
      broadcasting system information containing the target time parameter; and
   wherein updating a parameter value of a first duration parameter included in the system information does not trigger a notification for an update of the system information.

2. The method of claim 1, wherein the first time parameter comprises at least one of:

a first duration parameter configured to indicate information on a service duration during which the cell can provide a service, or a first time point parameter configured to indicate information on a time point when the cell stops providing the service.

3. The method of claim 1, further comprising:

determining a respective parameter value of a first duration parameter included in the system information for each sending period of the system information, based on a maximum service duration during which the cell can provide the service and a respective period duration of each sending period of the system information.

4. The method of claim 1, wherein sending the target time parameter comprises:

sending a Radio Resource Control (RRC) message comprising the target time parameter to the terminal.

5. The method of claim 4, wherein sending the RRC message comprising the target time parameter to the terminal comprises:

sending a RRC release message comprising the target time parameter to the terminal, in response to determining that the terminal switches from a connected state to an idle state or an inactive state.

6. The method of claim 5, further comprising:

determining, in response to the target time parameter comprising a first duration parameter configured to indicate information on a service duration during which the cell can provide the service, a parameter value of the first duration parameter comprised in the RRC release message based on a maximum service duration during which the cell can provide a service and a service duration during which the cell has provided the service.

7. The method of claim 1, wherein the target time parameter further comprises a second time parameter configured to indicate information on a service time of a neighbor cell, wherein the second time parameter comprises at least one of:

a second duration parameter configured to indicate information on a service duration during which the neighbor cell is going to provide a service to the terminal, a second time point parameter configured to indicate information on a start time point when the neighbor cell starts providing the service, or a third time point parameter configured to indicate information on a time point when the neighbor cell stops providing the service.

8. A cell reselection method, performed by a terminal, comprising:

receiving a target time parameter, wherein the target time parameter comprises a first time parameter configured to indicate information on a service time of a cell; and performing a cell reselection based on the target time parameter;

wherein receiving the target time parameter comprises receiving system information containing the target time parameter; and wherein updating a parameter value of a first duration parameter included in the system information does not trigger a notification for an update of the system information.

9. The method of claim 8, wherein the first time parameter comprises at least one of:

a first duration parameter configured to indicate information on a service duration during which the cell can provide a service, or a first time point parameter configured to indicate information on a time point when the cell stops providing the service.

10. The method of claim 9, wherein performing the cell reselection based on the target time parameter comprises:

configuring a timing duration of a cell reselection timer based on the first duration parameter, in response to the target time parameter comprising the first duration parameter; and performing the cell reselection in response to the cell reselection timer expiring.

11. The method of claim 10, wherein configuring the timing duration of the cell reselection timer based on the first duration parameter comprises one of:

configuring the timing duration of the cell reselection timer based on a parameter value of the first duration parameter comprised in received system information;

configuring the timing duration of the cell reselection timer based on a parameter value of the first duration parameter comprised in a received Radio Resource Control (RRC) release message; or configuring the timing duration of the cell reselection timer based on the parameter value of the first duration parameter comprised in the RRC release message, in response to receiving the system information comprising the first duration parameter and the RRC release message comprising the first duration parameter.

12. The method of claim 10, further comprising one of:

triggering to start the cell reselection timer, in response to entering the cell through the cell reselection and receiving system information comprising the first duration parameter;

triggering to start the cell reselection timer, in response to switching from a connected state to an idle state or an inactive state and receiving a RRC release message comprising the first duration parameter; or triggering to start the cell reselection timer in response to switching from the connected state to the idle state or the inactive state, a received RRC release message not comprising the first duration parameter, and received system information comprising the first duration parameter.

13. The method of claim 10, wherein after the cell reselection timer is started, the timing duration of the cell reselection timer remains unchanged.

14. The method of claim 9, wherein performing the cell reselection based on the target time parameter comprises:

performing the cell reselection before a time point indicated by the first time point parameter or when the time point indicated by the first time point parameter is reached, in response to the target time parameter comprising the first time point parameter.

15. The method of claim 8, wherein the target time parameter further comprises a second time parameter configured to indicate information on a service time of a neighbor cell, wherein the second time parameter comprises at least one of:

a second duration parameter configured to indicate information of a service duration during which the neighbor cell is going to provide a service to the terminal, a second time point parameter configured to indicate information on a start time point when the neighbor cell starts providing the service, or a third time point parameter configured to indicate information on a time point when the neighbor cell stops providing the service.

16. The method of claim 15, further comprising:

determining, based on the second duration parameter, a target neighbor cell to be switched to in performing the cell reselection, in response to the target time parameter comprising the second duration parameter; or determining, based on at least one of the second time point parameter or the third time point parameter, a target neighbor cell to be switched to in performing the cell reselection, in response to the target time parameter comprising at least one of the second time point parameter or the third time point parameter.

17. A terminal, comprising:

a processor; and a memory configured to store instructions executable by the processor; wherein the processor is configured to perform the cell reselection method of claim 8.

18. A base station, comprising:

a processor; and a memory configured to store instructions executable by the processor;

wherein the processor is configured to:

configure, for a terminal, a target time parameter for performing a cell reselection, wherein the target time parameter comprises a first time parameter configured to indicate information on a service time of a cell; and send the target time parameter, wherein the processor is further configured to broadcast system information containing the target time parameter; and wherein updating a parameter value of a first duration parameter included in the system information does not trigger a notification for an update of the system information.

* * * * *